UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

FIRE-EXTINGUISHING COMPOSITION HAVING LOW FREEZING-POINT.

1,292,744.     Specification of Letters Patent.     Patented Jan. 28, 1919.

No Drawing. Original application filed October 20, 1914, Serial No. 867,579. Divided and this application filed May 31, 1918. Serial No. 237,383.

*To all whom it may concern:*

Be it known that I, GEORGE E. FERGUSON, a citizen of the United States, and resident of the city, county, and State of New York, have invented certain new and useful Improvements in Fire-Extinguishing Compositions Having Low Freezing-Point, of which the following is a specification.

The object of this invention is to produce a composition or solution having a low freezing point or, more specifically, to lower the normal freezing point of the solvent of the composition. Carbon tetra chlorid has been selected as illustrative of a solvent which, being a solvent for many other compounds, is useful for many purposes, among which fire extinguishing compounds may be mentioned, carbon tetra chlorid being non-inflammable.

This application is a divisional application of Ser. No. 867,579, filed Oct. 20, 1914, and allowed Nov. 27, 1917.

The extensive uses to which carbon tetra chlorid may be put, make it desirable to, in many cases, lower its normal freezing point (which in the chamically pure state is $-19.5°$ C.) to permit of its use in localities where extreme cold weather prevails in order that it may be utilized as a liquid and at the same time maintain all of its useful properties.

With this in mind, I have performed a large number of experiments to ascertain if some underlying principle could be found to govern this depression of the freezing point.

It is a well known fact that, considering inorganic compounds and inorganic solvents, the depression of the freezing point depends upon the solubility of the salts used and the degree of dissociation which takes place when these salts are dissolved in a solvent (which solvent in most cases is water).

The laws governing the depression of the freezing point for "electrolytes" are simple:

1. The freezing point of a solution is lower than that of the pure solvent.

2. The depression of the freezing point is proportional to the concentration of the solution.

If "$t$" degrees be the depression produced by the presence of "$p$" grams of substance in 100 grams of the solvent, then the molecular depression $$C = \frac{t}{p}m$$

(where "$m$" is the molecular weight of the dissolved substance).

These laws do not hold good in the depression of the freezing point of carbon tetra chlorid. A good example of this is in the solution of a compound like azobenzene ($C_6H_5N_2C_6H_5$), which is very soluble in carbon tetra chlorid. When this solution is formed it is found to have a higher freezing point than that of the carbon tetra chlorid alone and the more azo compound dissolved the higher the freezing point.

When a number of such experiments were tried and no principle could be established, it was decided to try out all the "commercially possible" substances which could be dissolved in carbon tetra chlorid to ascertain which would depress the freezing point. It was found that, among the great variety of compounds tried out, about 150 accomplished the desired result.

It is understood that some of these compounds would prove detrimental to the use of carbon tetra chlorid under certain conditions while they might prove very acceptable under others.

To simplify the list, it was thought best to classify these substances under different chemical groups, such as, (1) esters and ethers; (2) amins and amino compounds; (3) aldehydes and ketones; (4) alcohols; (5) oils; (6) hydrocarbons, substitutes and derivatives; (7) phenols and phenol derivatives; (8) terpenes, camphors and (9) acids, etc.

About the only generality which can be made in regard to all this investigation is the fact that most compounds which are in the liquid state at normal (room) temperatures and which are soluble in carbon tetra chlorid lower the freezing point of the carbon tetra chlorid and, vice versa, most of the compounds which are solid at normal temperature and soluble in carbon tetra chlorid do not lower the freezing point but in most cases raise it. There are, however, enough exceptions to this generality to render it impossible of general application as a rule.

In this investigation no attempt was made to determine the quantity of substance dissolved in a known amount of solvent to produce an observed depression of the freezing point. It was thought that sufficient knowledge was gained in determining just what substances would accomplish the desired depression effect on the freezing point.

This application is directed more particularly to esters, in the group of esters and ethers, which are closely related. An ester is generally formed by the action of an organic acid on an alcohol, forming what may be termed an organic salt.

Among the esters which I have found suitable for this purpose may be mentioned: ethyl benzoate, $C_6H_5CO_2C_2H_5$; benzoyl chlorid, $C_6H_5COCl$; benzyl chlorid, $C_6H_5CH_2Cl$; benzonitrile, $C_6H_5CN$; benzydichlorid, $C_6H_5CHCl_2$; benzyl acetate, $CH_3CO_2CH_2C_6H_5$; benzyl benzoate, $C_6H_5CO_2CH_2C_6H_5$; and ethyl butyrate, $C_3H_7CO_2C_2H_5$.

It is obvious that it is practically impossible to cover every compound, in the manner described, to ascertain if the freezing point of carbon tetra chlorid could be lowered by dissolving the compound therein. I have, however, made tests in each class of compounds with commercially possible examples in each class. What future development may be made toward the reduction of the cost of a number of the expensive compounds, thus rendering the same "commercially possible", is problematical but my experiment and tests show that is is possible to generalize in these different classes or divisions. For example, I found that every ester and ether which was liquid at normal or room temperature would lower the freezing point of carbon tetra chlorid. (This statement is based on my tests of forty-five different compounds of this class which are soluble in carbon tetra chlorid.)

Four hundred and thirty experiments were performed; the substances selected being taken from the chemical catalogues. All of the organic substances costing one dollar or less per ounce were tried—as it was considered that these compounds, from the standpoint of cost, would be "commercially possible". It was found that a great many of these compounds were insoluble in carbon tetra chlorid and, therefore, eliminated themselves from the investigation.

What I claim is:

A fire extinguishing composition having a low freezing point comprising carbon tetra chlorid and ethyl benzoate in solution.

Signed at the city, county and State of New York, this 27th day of May, 1918.

GEORGE E. FERGUSON.

Witnesses:
 Fus E. Eckelmann,
 M. J. Cohen.